Dotterer & Jackson.
Inclined Railroad.
Nº 1,108.   Patented Mar. 25, 1839.
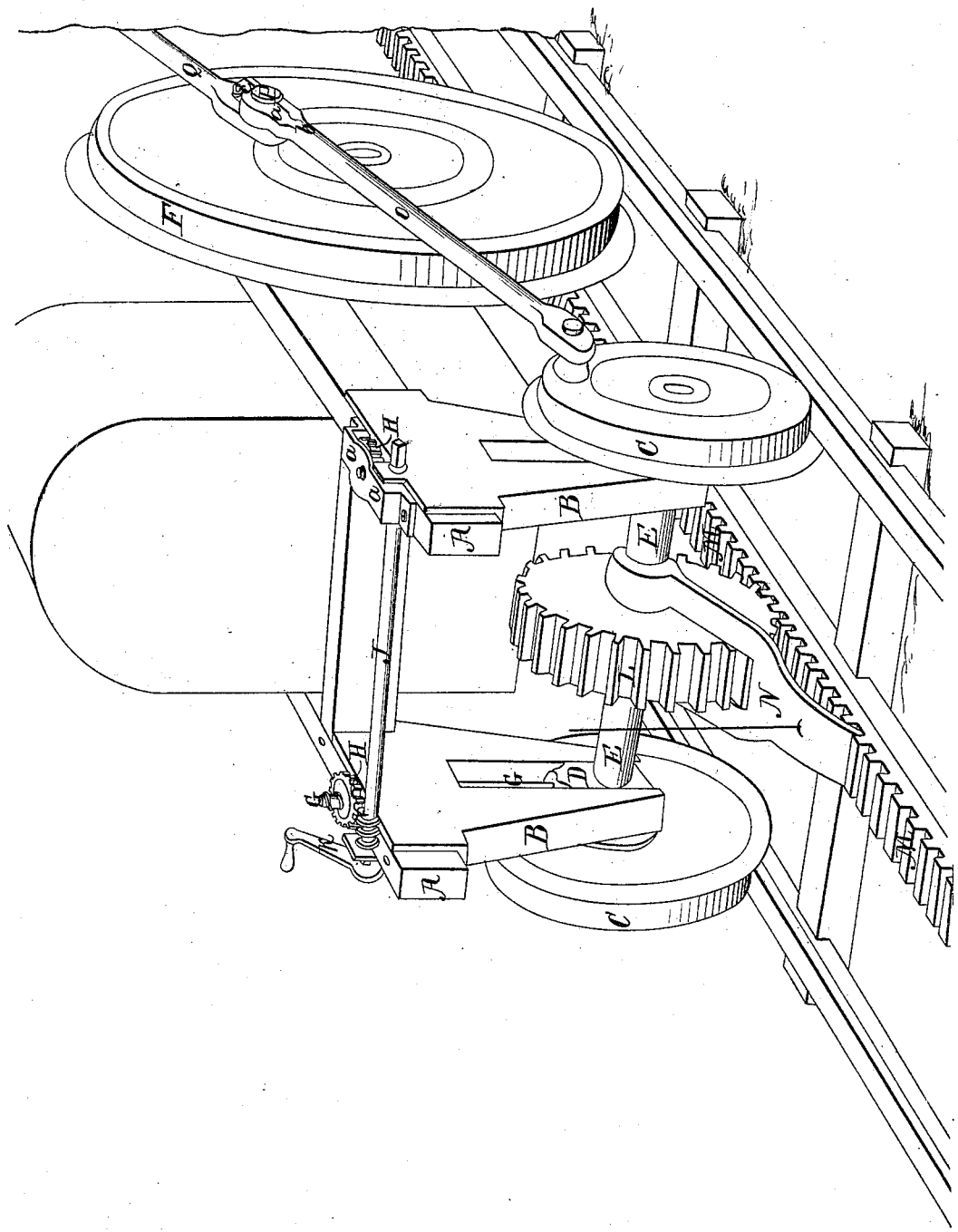

UNITED STATES PATENT OFFICE.

D. H. DOTTERER AND THOS. JACKSON, OF READING, PENNSYLVANIA.

LOCOMOTIVE-ENGINE FOR ASCENDING INCLINED PLANES.

Specification of Letters Patent No. 1,108, dated March 25, 1839.

*To all whom it may concern:*

Be it known that we, DAVIS H. DOTTERER and THOMAS JACKSON, of Reading, in the county of Berks and State of Pennsylvania, have invented an improvement in the manner of constructing locomotive-engines, which improvement is for the purpose of enabling them to ascend inclined planes with the train of cars which may be attached to them; and we do hereby declare that the following is a full and exact description thereof.

The accompanying drawing represents so much of the after end of a locomotive engine as is necessary to show the nature, operation, and object of our improvement.

To this part, and far enough behind the fire box to allow of the free working and convenient arrangement of our improvement, we attach to each side of the frame A, A, spring plates B, B, which we usually call by the name of power spring plates, although we intend in general, to use the wheels C, C, which are connected with them, without springs, their motion not being so rapid as to require them, although they may be added if preferred. The boxes D, D, sustain the axle E, E, and slide up and down between the cheeks of the spring plates, in the ordinary manner. The locomotive, when not ascending an inclined plane is sustained upon driving wheels, connected, and operating in any of the known ways, the power wheels C, C, not being then in action, but being raised up so as not to be in contact with the rails; but when ascending an inclined plane these power wheels are to be lowered, and brought into contact with the rails, causing the ordinary hind wheels F, of the locomotive, to be raised therefrom. To effect this, the lifting screws G, G, are permanently attached to the boxes D. The cogged nuts H, H, fit on to the screw G, having their bearings on the top of the frame A, A; caps, *a, a,* one of which is removed, serving to hold the nut H, H, above. Into the teeth of each of these nuts an endless screw I, upon the shaft J, mashes in such a manner as to turn them in either direction; the shaft J, crosses from the side of the frame, and may have a winch K, on each end, by means of which the locomotive may be raised or lowered with facility.

The constructor of such machines, should it be preferred, will at once perceive that the power of the engine may, itself, be employed to turn the nuts H, H, by means of such gearing as every competent engineer can readily apply, and which, therefore, need not be described. The power wheels C, C, are flanched, are the same distance apart as the main wheels of the locomotive, and may be in all respects like them excepting in diameter. The axle E, of these power wheels, we make stronger than the ordinary axles, as they are to bear a greater strain. Upon the center of this axle we affix a strong cog wheel L, which has the circle of its pitch line a little less in diameter than that of the bearing surface, or tread of the wheels C, C. When brought into action this cog wheel gears into the rack M, M, which is firmly fixed to the sleepers upon which the rails are sustained, or otherwise so constructed and attached, as that it shall not be liable to be displaced, but shall truly gear with the pitch line of the cog-wheel, when the power wheels rest upon the rails. To prevent accident, however, we construct a strong pawl N, which as the locomotive ascends shall bear upon, and engage with, the rack. A double pawl may be employed if preferred. The rack M, M, must commence about the length of the locomotive from the inclined plane, on the lower level, to allow of the gearing of the cog wheel before the ascent is begun, and it must be continued up the plane, and to such distance beyond it on the upper level as shall be equal to the length of the longest train of cars which it is designed to carry up. The power wheels C, C, when brought into action are to be connected to the wheels F, by means of the connecting rods O, the pins P, that are operated on by the rods Q, being lengthened for the purpose of receiving them. The connecting rods O, are so formed that they may be readily attached and detached; we have found the manner of doing this, shown in the drawing to be very convenient, namely, we make the lower portion of the box *a,* of the connecting rod O, with a hinge joint at *b,* and fasten the parts together by means of a staple, and spring key at *c.* When the boxes D, are lowered to the mark at which they are to be arrested, the wheels C, and F, will be in the proper situation for attaching the connecting rods, and during the ascent of the engine and train the wheels F, being raised from the road, will operate merely as fly wheels; the distance to which we usually raise them is two inches.

We make the diameter of the tread of the power wheels a trifle greater than that of the cog wheels, thus giving the former a tendency to roll in advance of the cog; the cogs of the wheel and rack will thus have the advantage of their adhesion to the rails, until by slipping they may be worn to the true pitch line of the cog wheel.

If the diameter given to the flanched power wheels be two thirds of the diameter of the ordinary driving wheels, the engine will ascend an inclined plane with two and a half times its ordinary power; and this power may be augmented in the way described, by a further diminution of the size of the power wheels. This diminution is limited, however, by the necessity of having the engine sufficiently raised for the ash pan to clear the rack rail; by making a groove in the ash pan some advantage may be obtained in this particular.

We believe that it will rarely, if ever, be found necessary to increase the power of ascent beyond that which can be attained by the simple arrangement above set forth; but should this be the case it may be effected upon the same general principle of sustaining the hind end of the engine upon power wheels capable of being lowered and raised, and having their bearings, when in action, upon the ordinary rails. The most simple mode of effecting this, will be to diminish the diameter of the cog wheel and to raise the rack high enough for them to gear together, leaving the power wheels of such diameter beyond that of the cog wheel as may be preferred. When this is done the power wheels must be made to turn upon the power axle, and this axle must be lengthened out at each end so as to carry a crank which shall describe a circle exactly equal to that described by the collar pin upon the driving wheel F, to which said cranks are to be coupled by the connecting rods O. This mode is not preferred, and is given merely to show one way in which our principle may be varied to attain increased power; but the adhesion of the power to the rails, is, in this case, lost.

Should double gearing be resorted to, the power of ascent may be increased to ten or fifteen times the ordinary power of the engine. In this case a second cog wheel is placed upon the power axle, on either side of that which gears into the rack rail. This second wheel may be as large as will not interfere with its clearing the road, and into this gear a small cog-wheel, upon a second axle, which is to cross like the power axle before described, from side to side of the frame of the locomotive, its ends projecting through the boxes in which its runs, and carrying cranks of the proper length, by which it is to be coupled to the collar pins of the driving wheels F, as in the last described example. This as well as the variation before described, we give to show that our principle of construction may be modified in various ways, and that we do not intend to limit ourselves to the precise arrangement shown in the drawing herein referred to.

What we claim as our invention, and desire to secure by Letters Patent, is—

The locating of the two wheels which we have denominated flanched power wheels in the rear of the frame of a locomotive engine behind the ordinary rear driving wheels, providing the means of raising and lowering such wheels, so as to bring a cog wheel, affixed, on the center of the same axle, into gear with a rack rail and to raise the driving wheel clear of the truck substantially in the manner herein set forth, for the purpose of enabling such locomotives, with the train attached to them, to ascend inclined planes, by the operation of the ordinary power of the engine.

DAVIS H. DOTTERER.
THOMAS JACKSON.

Witnesses:
D. K. MORSELL,
LINTON THORN.